United States Patent [19]

Wolfe et al.

[11] Patent Number: 4,607,017

[45] Date of Patent: Aug. 19, 1986

[54] SILICON NITRIDE BASED CUTTING TOOL

[75] Inventors: Robert W. Wolfe, Wysox; Dale E. Wittmer, Towanda, both of Pa.

[73] Assignee: GTE Products Corporation, Stamford, Conn.

[21] Appl. No.: 746,705

[22] Filed: Jun. 20, 1985

[51] Int. Cl.$^4$ ............................................. C04B 35/58
[52] U.S. Cl. ...................... 501/98; 51/307; 82/1 C; 501/152
[58] Field of Search .............. 501/98, 97, 152, 154; 51/307, 308, 309; 264/60; 82/1 C

[56] References Cited

U.S. PATENT DOCUMENTS

| 4,127,416 | 11/1978 | Lumby et al. | 501/98 |
| 4,280,973 | 7/1981 | Moskowitz et al. | 51/307 |
| 4,323,325 | 4/1982 | Samanta et al. | 501/152 |
| 4,462,817 | 7/1984 | Wolfe et al. | 264/332 |

FOREIGN PATENT DOCUMENTS

| 58-88175 | 5/1983 | Japan | 501/97 |
| 59-21580 | 2/1984 | Japan | 501/154 |

*Primary Examiner*—Helen M. McCarthy
*Attorney, Agent, or Firm*—Donald R. Castle; L. Rita Quatrini

[57] ABSTRACT

A silicon nitride based cutting tool is disclosed consisting essentially of in percent by weight about 5% aluminum oxide, about 6% yttrium oxide, from about 1.5% to about 5.5% silicon dioxide, and the balance silicon nitride, and having a density of at least about 99% of the theoretical density.

1 Claim, No Drawings

SILICON NITRIDE BASED CUTTING TOOL

BACKGROUND OF THE INVENTION

Aluminum oxide substitution into the silicon nitride crystal structure has been known for a long time. An early work on this subject is due to Oyama and Kamigaito entitled "Solid Solubility Of Some Oxides In $Si_3N_4$", Japan J. Appl. Phys. 10, 1637 (1971). They hot pressed mixtures of aluminum oxide and silicon nitride and found that a new phase was formed with expanded lattice parameters. These results, taken with "comparatively good agreement" with expected densities based on the crystal structure expansion, led these authors to conclude that "the new phase is a solid solution of $Si_3N_4$ and $Al_2O_3$." Oyama et al worked in the range of about 5 to about 16% by weight $Al_2O_3$. In 1975, these authors were awarded U.S. Pat. No. 3,903,230 in which is claimed a method of making these solid solutions from $Si_3N_4$ and $Al_2O_3$ and/or AlN, the composition of the solid solution ranging from about 15% to about 87% by weight $Al_2O_3$. Later, in 1976, Jack and Wilson were awarded U.S. Pat. No. 3,991,166 in which a ceramic material consisting of at least 90% of a silicon aluminum oxynitride solid solution was claimed, as well as methods for making it. The solid solutions all these workers were making have come to be known as sialons.

The above materials are not satisfactory for the purpose of ceramic cutting tools. It was later found that at least one modifying compound which combines with the $SiO_2$ impurity on the $Si_3N_4$ was essential to increase the strength and toughness of the material. This is true for the $Si_3N_4$ based cutting tool compositions described in U.S. Pat. No. 4,401,617 as well as for the sialon-based compositions described in U.S. Pat. 4,127,416.

For $Si_3N_4$-based compositions, U.S. Pat. No. 4,401,617 claims a method for making a cutting tool in which about 7% to about 9% of the composition is $Y_2O_3$. This method allows for up to about 2.5% by weight of $Al_2O_3$, WC, TiC, and $Si_3N_4$ which is added by attrition of the milling media.

For sialon-based compositions, ($Si_3N_4$-$Al_2O_3$ or $Si_3N_4$-$Al_2O_3$-AlN solid solutions), U.S. Pat. No. 4,127,416 claims a method of producing a "ceramic product" in which the modifying compound $R_2O_3$ (R=Y, Sc, Ce, or La) is added in the range of from about 0.1% to about 10% of the sialon product. The $Al_2O_3$ range covers from about 6% to about 20% by weight.

U.S. Pat. No. 4,280,973 discloses a method for making $Si_3N_4$ based cutting tools by the cold press and sinter method, a method which for years has been common practice in the cemented carbide cutting tool industry. This method allows for the primary modifying compounds $Y_2O_3$, $CeO_2$, MgO, and $ZrO_2$ and no more than about 4% by weight $Al_2O_3$, WC, $WSi_2$, W, or TiC added by attrition of the grinding media.

This invention relates to a silicon nitride based cutting tool containing aluminum oxide, yttrium oxide and silicon dioxide.

SUMMARY OF THE INVENTION

In accordance with one aspect of this invention, there is provided a silicon nitride based cutting tool consisting essentially of in percent by weight about 5% aluminum oxide, about 6% yttrium oxide, from about 1.5% to about 5.5% silicon dioxide and the balance silicon nitride, and having a density of at least about 99% of the theoretical density.

DETAILED DESCRIPTION OF THE INVENTION

For a better understanding of the present invention, together with other and further objects, advantages, and capabilities thereof, reference is made to the following disclosure and appended claim in connection with the above description of some of the aspects of the invention.

The cutting tool of this invention is used preferably in the machining of cast iron.

The cutting tool is made essentially of silicon nitride based material. The silicon nitride based material consists essentially of in percent by weight about 5% aluminum oxide, about 6% yttrium oxide, from about 1.5% to about 5.5% silicon dioxide, and the balance silicon nitride. The silicon dioxide is generally present as an impurity in the silicon nitride. The oxygen content of the silicon nitride varies, but is generally in the range of from about 1% to about 3% by weight corresponding to from about 2% to about 6% silicon dioxide in the silicon nitride.

The silicon nitride based material in powder form is processed to increase the surface area of the material to make it suitable for the subsequent pressing and consolidation operations and to incorporate a binder which is preferably stearic acid. This can be done by any method known in the art. The preferred method is by dry milling followed by vibratory milling with incorporation of the binder. The resulting powder has a surface area which is typically greater than about 10 $m^2/g$. The binder typically makes up from about 8% to about 10% by weight of the combined powder-binder mixture.

This powder-binder mixture can be classified as necessary by standard methods such as screening to obtain the desired particle size.

The powder-binder mixture is then pressed by any standard method to obtain a part having a green density of generally from about 60% to about 65% of the theoretical density. The usual method is by dry pressing at about 12 tons per square inch. The resulting part typically measures about ¼" square and about 3/16" thick. However, it is to be understood that parts of any geometry can be pressed.

The binder is then removed from the resulting green part by any standard dewaxing method. When stearic acid is used as the binder, removal is done by slow heating in air to about 500° C.

The resulting dewaxed green parts are next consolidated to at least about 99% of the theoretical density.

The consolidation can be done by any number of methods known in the art, such as by pressureless sintering in ambient nitrogen, sintering with applied nitrogen pressure, by hot pressing, or by hot isostatic pressing. The latter process is described in U.S. Pat. No. 4,462,817. That patent is hereby incorporated by reference.

The preferred method of consolidation, because it is the most economical is pressureless sintering in ambient nitrogen or nitrogen overpressure not exceeding about 300 psi. In this method the sintering temperature is generally from about 1725° C. to about 1800° C. and the sintering times are generally from about 1 hour to about 4 hours.

The resulting part or cutting tool consists essentially of in percent by weight about 5% aluminum oxide, about 6% yttrium oxide, from about 1.5% to about 5.5% silicon dioxide, and the balance silicon nitride and has a density of at least about 99% of the theoretical density. In general, the cutting tools can be made in any convenient shape.

To more fully illustrate this invention, the following non-limiting examples are presented. All percentages are by weight.

EXAMPLE 1

Table 1 below shows the relative densities of cutting tool blanks sintered in about 1 atmosphere (ambient) of nitrogen for a time of about 4 hours at the maximum temperature.

It can be seen that compositions with less aluminum oxide than the aluminum oxide content of this invention and essentially the same amount of yttrium oxide do not completely densify in the above sintering temperature range or even at higher temperatures in ambient nitrogen.

TABLE 1

Relative Density of $Si_3N_4$ based tool blanks with the composition 6% $Y_2O_3$, from about 1.5% to about 5.5% $SiO_2$, X $Al_2O_3$, and the balance $Si_3N_4$.

| $Al_2O_3$ Content | Sintering Temperature °C. | | | | |
|---|---|---|---|---|---|
| | 1650 | 1725 | 1775 | 1800 | 1825 |
| 5% | 97.8 | 99.6 | 99.7 | 100.0 | 100.0 |
| 2% | — | 91.0 | 95.7 | 97.7 | 98.2 |

Note that the composition with the 5% $Al_2O_3$ sintered to essentially full density at 1725° C. while the composition with 2% $Al_2O_3$ could not be sintered to full density, thus showing an advantage of the $Al_2O_3$ level of this invention.

EXAMPLE 2

It has also been discovered that the composition 5% $Al_2O_3$, 6% $Y_2O_3$, about 1.5% to about 5.5% $SiO_2$, and the balance $Si_3N_4$ performed equivalently to compositions containing less $Al_2O_3$ in the machining of cast iron, while at the same time performing better than compositions with higher $Al_2O_3$ contents, particularly in interrupted cutting situations.

Table 2 shows the nose wear on SNG 432 tools with a 0.005"×30° T-land edge preparation when cutting cast iron in single point turning under various conditions of speed, feed, and depth of cut. These tools are hot isostatically pressed as disclosed in U.S. Pat. No. 4,462,817. These data show that even with hot isostatic pressing, for each set of conditions, the wear resistance of the 5% $Al_2O_3$ composition is better than lower amounts of $Al_2O_3$. The cast iron is Class 40 gray cast iron, with a standard tensile strength of about 40,000 psi and a hardness of about 200 to about 240 BHN.

TABLE 2

Nose wear of cutting tools of composition X $Al_2O_3$, 6% $Y_2O_3$, from about 1.5% to about 5.5% $SiO_2$, and the balance $Si_3N_4$.

| | Nose Wear (Mils) For Cutting Conditions | | | |
|---|---|---|---|---|
| % $Al_2O_3$ | 1* | 2** | 3*** | 4**** |
| 1 | 50 | 40 | 28 | 26 |
| 3.5 | 37 | 34 | 24 | 22 |
| 5.0 | 32 | 30 | 20 | 19 | cutting

TABLE 2-continued

Nose wear of cutting tools of composition X $Al_2O_3$, 6% $Y_2O_3$, from about 1.5% to about 5.5% $SiO_2$, and the balance $Si_3N_4$.

| | sfpm | feed | depth of cut | time (min.) |
|---|---|---|---|---|
| *1. | 4000 | .020" | .050" | 1 |
| **2. | 2500 | .010" | .050" | 2 |
| ***3. | 1500 | .040" | .050" | 3 |
| ****4. | 1500 | .010 | .050 | 3 |

EXAMPLE 3

Table 3 shows single point turning data in gray cast iron for a 5% $Al_2O_3$, 6% $Y_2O_3$, from about 1.5% to about 5.5% $SiO_2$, and the balance $Si_3N_4$ cutting tool that is sintered in 1 atmosphere of $N_2$, and for a 2% $Al_2O_3$, 6% $Y_2O_3$, from about 1.5% to about 5.5% $SiO_2$, and the balance $Si_3N_4$ cutting tool that is sintered with an overpressure of about 18 atmospheres of $N_2$. The data again show that the 5% $Al_2O_3$ composition is more wear resistant than the composition with less $Al_2O_3$.

TABLE 3

Nose wear of X $Al_2O_3$, 6% $Y_2O_3$, from about 1.5% to about 5.5% $SiO_2$, and the balance $Si_3N_4$ cutting tools in gray cast iron at about 2500 sfpm, about .015" feed, about .035" depth of cut.
Length of cutting time about 4½ minutes. Hardness of cast iron is about 200 BHN.

| % $Al_2O_3$ | Nose Wear (Mils) |
|---|---|
| 2 | 13 |
| 5 | 10 |

EXAMPLE 4

Table 4 shows that the 5% $Al_2O_3$ composition is considerably tougher than compositions with higher contents of $Al_2O_3$. This data shows the number of impacts that the cutting tool withstands while turning a slotted cast iron work piece. The work piece is slotted with 4 longitudinal grooves that are about ½" wide. Thus, the cutting tool reenters the work piece 4 times for every revolution of the work piece. These tools are consolidated by hot isostatic pressing as disclosed in U.S. Pat. No. 4,462,817.

TABLE 4

Relative toughness of X $Al_2O_3$, 6% $Y_2O_3$, from about 1.5% to about 5.5% $SiO_2$ and the balance $Si_3N_4$, (as determined by machining a gray cast iron slotted bar at about 1500 sfpm, about .025" feed, and about .035" depth of cut.)

| % $Al_2O_3$ | No. of Impacts Before Breakage |
|---|---|
| 5 | 7000 |
| 10 | 2600 |
| 20 | 3000 |

While there has been shown and described what are at present considered the preferred embodiments of the invention, it will be obvious to those skilled in the art that various changes and modifications may be made therein without departing from the scope of the invention as defined by the appended claims.

What is claimed is:

1. A silicon nitride based cutting tool consisting essentially of in percent by weight about 5% aluminum oxide, about 6% yttrium oxide, from about 1.5% to about 5.5% silicon dioxide, and the balance silicon nitride, said cutting tool having a density of at least about 99% of the theoretical density.

* * * * *